(12) United States Patent
Graff et al.

(10) Patent No.: US 6,322,768 B1
(45) Date of Patent: *Nov. 27, 2001

(54) RECOVERY OF CHLORINE DIOXIDE FROM GAS STREAMS

(75) Inventors: Robert L. Graff, Loveland, OH (US); Larry A. Couture, Erie; Al G. Lewis, North East, both of PA (US)

(73) Assignee: International Paper Company, Purchase, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/170,911

(22) Filed: Oct. 13, 1998

Related U.S. Application Data

(60) Provisional application No. 60/102,335, filed on Sep. 29, 1998.

(51) Int. Cl.$^7$ .............................. C01B 11/02; D06L 3/08
(52) U.S. Cl. ................... 423/477; 423/240 R; 162/67
(58) Field of Search .......................... 423/240 R, 472, 423/477; 162/67

(56) References Cited

U.S. PATENT DOCUMENTS

| | | | |
|---|---|---|---|
| 2,036,311 | 4/1936 | White | 23/152 |
| 2,036,375 | 8/1936 | Vincent | 23/152 |
| 2,169,066 | 8/1939 | Cunningham | 23/85 |
| 2,332,180 * | 10/1943 | Soule | 423/472 |
| 2,616,783 * | 11/1952 | Wagner | 423/472 |
| 3,450,493 * | 6/1969 | Du Bellay et al. | 423/472 |
| 3,619,350 | 11/1971 | Marchfelder | 162/67 |
| 3,755,068 | 8/1973 | Rapson | 162/30 |
| 3,789,108 | 1/1974 | Rapson | 423/478 |
| 3,829,557 | 8/1974 | Winfield | 423/478 |
| 3,925,540 | 12/1975 | Hatherly | 423/478 |
| 3,929,975 | 12/1975 | Winfield | 423/478 |
| 4,070,233 | 1/1978 | Matsuura | 162/48 |
| 4,079,123 | 3/1978 | Fuller et al. | 423/478 |
| 4,081,520 | 3/1978 | Swindells et al. | 423/478 |

(List continued on next page.)

FOREIGN PATENT DOCUMENTS

| | | | |
|---|---|---|---|
| 53-66892 | 6/1978 | (JP) . | |
| 63-8203 | 1/1988 | (JP) . | |
| 55-098965 * | 7/1980 | (JP) | 423/475 |

OTHER PUBLICATIONS

Jacobson, "Encyclopedia of Chemical Reactions", vol. II, pp. 687, 726, 1948 (no month).*

Translation of JP 55–98, 965, Jul. 1980.*

*The Bleaching of Pulp* (Rudra P. Singh, Ed. Tappi Press, 3$^{rd}$ ed. 1991, pp. 20–21, 305–306). (no month).

Gary A. Smook, *Handbook for Pulp & Paper Technologists* Angus Wilde Publications, 2d ed., 1992, pp. 178–179. (no month).

Christopher J. Biermann, *Handbook of Pulping and Papermaking* (Academic Press, 2d ed., 1996, pp. 129, 132–133, 381). (no month).

Sven A. Rydholm, *Pulping Processes* (Robert E. Krieger Publishing Co. 1985, pp. 972–987). no month.

*Primary Examiner*—Ngoc-Yen Nguyen
(74) *Attorney, Agent, or Firm*—Darby & Darby

(57) ABSTRACT

A method for recovering chlorine dioxide from a gas. The method involves contacting gas containing chlorine dioxide with an alkaline metal base and peroxide to form an alkaline metal chlorite solution, and oxidizing the alkaline metal chlorite solution to generate chlorine dioxide.

13 Claims, 1 Drawing Sheet

U.S. PATENT DOCUMENTS

| | | | |
|---|---|---|---|
| 4,105,751 | 8/1978 | Caillol | 423/478 |
| 4,129,484 | 12/1978 | Larson | 204/101 |
| 4,145,401 | 3/1979 | Swindells et al. | 423/478 |
| 4,154,809 | 5/1979 | Swindells et al. | 423/478 |
| 4,156,713 | 5/1979 | Fuller | 423/478 |
| 4,216,195 | 8/1980 | Jaszka et al. | 423/478 |
| 4,234,446 | 11/1980 | Ramras | 252/187 |
| 4,251,502 | 2/1981 | Forster | 423/478 |
| 4,414,193 | 11/1983 | Fredette et al. | 423/478 |
| 4,465,658 | 8/1984 | Fredette | 423/478 |
| 4,473,540 | 9/1984 | Fredette | 423/479 |
| 4,590,057 * | 5/1986 | Hicks | 423/477 |
| 4,618,479 | 10/1986 | Santillie et al. | 422/202 |
| 4,627,969 | 12/1986 | Fredette et al. | 423/478 |
| 4,678,653 | 7/1987 | Norell et al. | 423/478 |
| 4,678,654 | 7/1987 | Holmstrom et al. | 423/478 |
| 4,678,655 | 7/1987 | Twardowski | 423/478 |
| 4,770,868 | 9/1988 | Norell | 423/479 |
| 4,795,535 | 1/1989 | Bolduc et al. | 204/95 |
| 4,795,619 | 1/1989 | Lerner | 423/244 |
| 4,904,461 | 2/1990 | Yant et al. | 423/478 |
| 4,931,268 | 6/1990 | Fredette et al. | 423/479 |
| 4,938,943 | 7/1990 | Norell | 423/478 |
| 4,961,918 | 10/1990 | Norell et al. | 423/479 |
| 4,978,517 | 12/1990 | Norell et al. | 423/479 |
| 4,986,973 | 1/1991 | Svedin et al. | 423/479 |
| 5,002,746 | 3/1991 | Norell | 423/479 |
| 5,061,471 | 10/1991 | Sundblad et al. | 423/480 |
| 5,066,477 | 11/1991 | Sell et al. | 423/479 |
| 5,091,166 | 2/1992 | Engstrom et al. | 423/478 |
| 5,091,167 | 2/1992 | Engstrom et al. | 423/478 |
| 5,093,097 | 3/1992 | Engstrom | 423/479 |
| 5,143,580 | 9/1992 | Basta et al. | 162/40 |
| 5,145,660 | 9/1992 | Wicksrom | 423/480 |
| 5,149,442 | 9/1992 | Engstrom et al. | 210/724 |
| 5,154,910 | 10/1992 | Engstrom | 423/478 |
| 5,165,910 | 11/1992 | Oikawa et al. | 423/477 |
| 5,174,868 | 12/1992 | Lipsztajn et al. | 204/95 |
| 5,227,031 | 7/1993 | Sundblad | 204/104 |
| 5,273,733 | 12/1993 | Winters et al. | 423/477 |
| 5,284,553 | 2/1994 | Lipsztajn et al. | 204/95 |
| 5,326,546 * | 7/1994 | Rosenblatt et al. | 423/241 |
| 5,364,604 | 11/1994 | Spink et al. | 423/210 |
| 5,366,714 | 11/1994 | Bigauskas | 423/478 |
| 5,380,517 | 1/1995 | Sokol | 423/478 |
| 5,545,389 | 8/1996 | Winters et al. | 423/478 |
| 5,565,180 * | 10/1996 | Spink | 423/240 R |
| 5,565,182 | 10/1996 | Sokol | 423/478 |
| 5,589,031 | 12/1996 | Farnstrand et al. | 162/65 |
| 5,674,466 | 10/1997 | Dahl et al. | 423/478 |
| 5,676,920 | 10/1997 | Lipsztajn | 423/478 |
| 5,770,171 | 6/1999 | Sundblad et al. | 423/479 |
| 5,792,316 * | 8/1998 | Tsai | 162/65 |
| 5,851,374 | 12/1998 | Cowley et al. | 205/471 |
| 5,858,322 | 1/1999 | Gray | 423/478 |
| 5,895,638 | 4/1999 | Tenney | 423/478 |

* cited by examiner

RECOVERY OF CHLORINE DIOXIDE FROM GAS STREAMS

This application claims priority under 35 U.S.C. §119 from provisional application Ser. No. 60/102,335, filed Sep. 29, 1998, entitled "Recovery of Chlorine Dioxide from Gas Streams", which application is hereby incorporated by reference.

FIELD OF THE INVENTION

This invention relates to a method for recovering chlorine dioxide from gases, such as those that are vented in a plant that uses chlorine dioxide as a bleaching agent.

BACKGROUND OF THE INVENTION

Chlorine dioxide has been commonly used for bleaching pulp since the late 1950s. The process is referred to as the "D" stage of a pulp bleach plant and involves reacting pulp in water with bubbles of chlorine dioxide gas. This causes highly selective destruction of lignin without significant accompanying degradation of cellulose or hemicellulose. The strength of the pulp is preserved, while the pulp is stably brightened. Such bleaching of pulp is described in the following references: The Bleaching of Pulp (Rudra P. Singh, Ed. Tappi Press, $3^{rd}$ ed. 1991); Gary A. Smook, Handbook for Pulp & Paper Technologists (Angus Wilde Publications, 2d ed., 1992); Christopher J. Biermann, Handbook of Pulping and Papermaking (Academic Press, 2d ed., 1996); Sven A Rydholm, Pulping Processes (Robert E. Krieger Publishing Co. 1985).

However, part of the chlorine dioxide that is used in the bleaching process becomes entrained in vent gas that is recovered from various locations in the bleach plant. Since chlorine dioxide is an environmental contaminant whose release is subject to regulatory limitations, it must be removed from the vent gas. This is normally accomplished using a scrubber that employs compounds or solutions that destroy the gaseous chlorine dioxide. Suitable chemicals for destroying chlorine dioxide gas include each of sodium thiosulfate, sulfur dioxide, caustic solution, and sulfide. For example, as described in U.S. Pat. No. 5,326,546, chlorine dioxide gas can be removed from a gas stream using a scrubbing solution containing sodium thiosulfate and an inorganic base, such as sodium hydroxide.

Such chemical treatment, however, is expensive. Furthermore, chlorine dioxide that is destroyed in vent gas must be replaced in the D stage of the bleaching operation.

There is therefore a need for a method that avoids loss of chlorine dioxide in vent gas generated in a bleaching operation, and minimizes the need for expensive scrubbing chemicals.

SUMMARY OF THE INVENTION

In one embodiment, the invention relates to a method for recovering chlorine dioxide from a gas stream which involves the steps of:
a) contacting the chlorine dioxide in the gas stream with an alkaline metal base and peroxide to form an alkaline metal chlorite solution; and
b) oxidizing the alkaline metal chlorite solution to generate chlorine dioxide.

In another embodiment, the invention relates to a method for scrubbing chlorine dioxide from bleach plant vent gas involving contacting the chlorine dioxide with alkaline metal base and peroxide in a vent gas scrubber to form alkaline metal chlorite solution, and removing the alkaline metal chlorite solution from the scrubber.

DETAILED DESCRIPTION OF THE INVENTION

Figure 1:
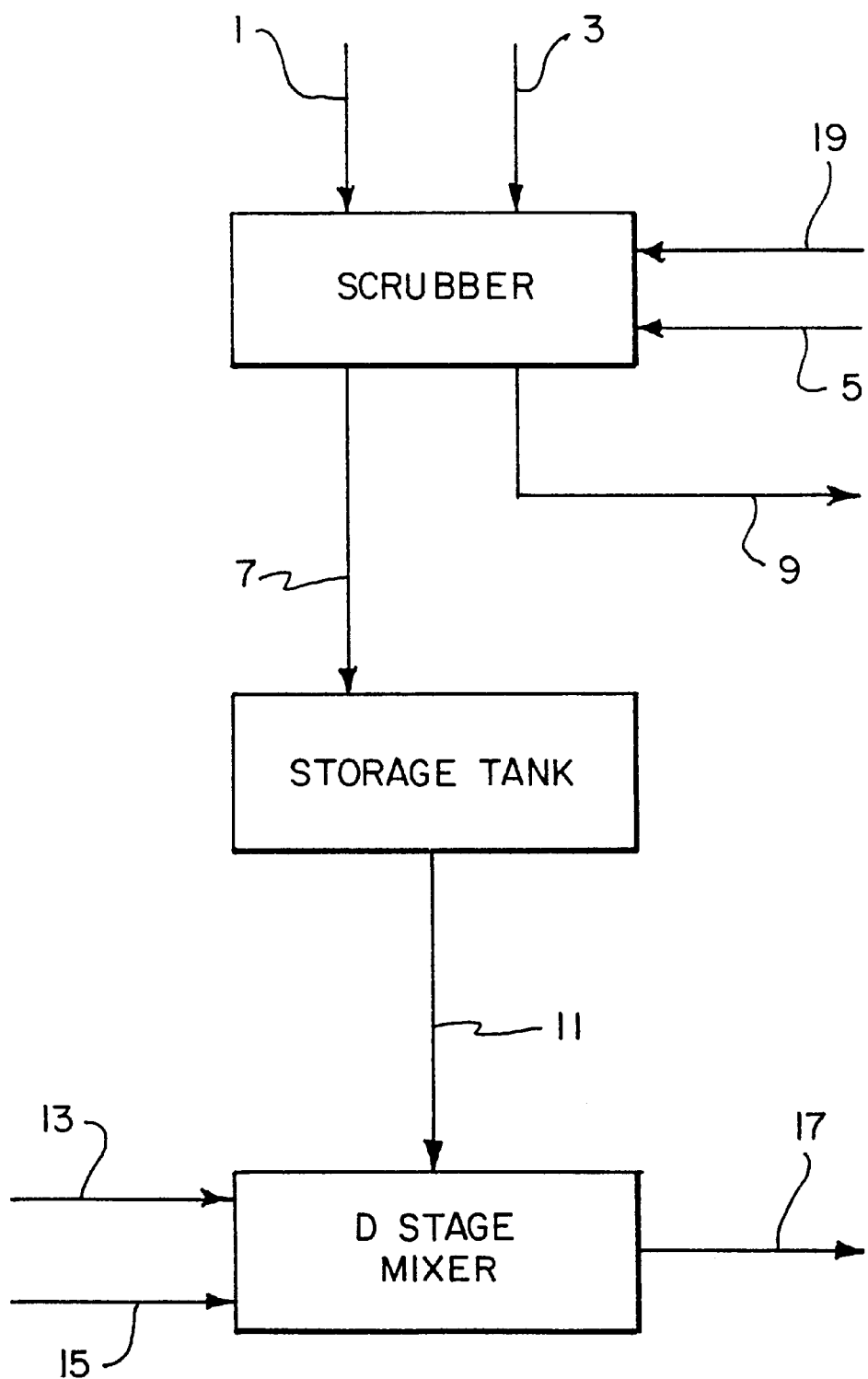
FIG. 1 is a flow chart depicting scrubbing of vent gas containing chlorine dioxide to produce alkaline metal chlorite solution, and introduction of the alkaline metal chlorite solution into the bleach plant D stage to regenerate chlorine dioxide.

All patents, patent applications, and publications cited herein are hereby incorporated by reference.

The present invention allows chlorine dioxide to be recovered from bleach plant gases, producing a substantial cost savings resulting from a reduced need for chlorine dioxide in the D stage of the bleach plant. Furthermore, the invention avoids use of expensive scrubbing chemicals that would otherwise be required to remove the chlorine dioxide from the vent gas. The invention also avoids possible release of environmentally harmful emissions, such as those containing sulfur.

According to the invention, chlorine dioxide that is entrained in a gas, such as vent gas from a bleach plant, is contacted with an alkaline metal base and peroxide to form an alkaline metal chlorite solution. This process normally takes place in a scrubber at a pH greater than 10, and an oxidation reduction potential (ORP) of less than 100. The alkaline metal chlorite solution is then oxidized to form chlorine dioxide, preferably by introduction into the D stage of the pulp bleaching process.

In a preferred embodiment of the invention, the following chemical process takes place:

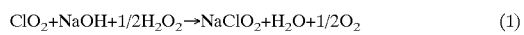  (1)

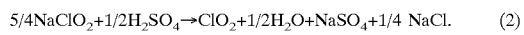  (2)

In this embodiment, sodium hydroxide is employed as the alkaline metal base, and reaction (1) occurs in a scrubbing apparatus. For example, the sodium hydroxide can be introduced as a 20% solution in combination with a 5% peroxide solution in liquid that is introduced into one or more scrubbers employed at a bleach plant. Sodium chlorite solution formed according to reaction (1) in the scrubber is then removed and added in reaction (2) so as to generate chlorine dioxide. For example, the sodium chlorite solution can be introduced at a point of suction of a D stage mixer that combines pulp with chlorine dioxide, wherein the chlorine dioxide contacts sulfuric acid in the bleaching solution, and generates chlorine dioxide according to the reaction shown.

It is, however, possible, according to the invention, to contact the alkaline metal chlorite solution with acid in any manner that forms chlorine dioxide. For example, the chlorite solution can be added to the pulp before, or after, the pulp enters a pulp/chlorine dioxide mixer. Preferably, however, the chlorite solution is added at a point in the process such that it is well mixed with the acid. It is also possible, according to the invention, to recover alkaline metal chlorite solution from chlorine dioxide generated outside the bleach plant, and add the chlorite solution to the D stage. The invention also encompasses obtaining chlorite solution from a bleach plant scrubber, and oxidizing the chlorite outside of the D stage to generate chlorine dioxide. Preferably, both the scrubbing to obtain chlorite solution and the oxidation of chlorite solution occur at the bleach plant.

Any suitable acid can be employed in the reaction with alkaline metal chlorite solution to regenerate chlorine dioxide, including, without limitation, sulfuric acid, hydrochloric acid, and nitric acid.

Suitable alkaline metal bases for contacting with the chlorine dioxide gas in the scrubber include, without limitation, sodium hydroxide, potassium hydroxide, sodium carbonate, potassium carbonate, sodium monoxide, and potassium monoxide. Sodium hydroxide is preferred.

It is also possible, according to the invention, to add the alkaline metal chlorite solution, e.g, sodium chlorite solution, in a bleaching solution of the D stage wherein the chlorite contacts chlorine that has been added to the bleaching stage. In this embodiment, for example, chlorine dioxide can be formed according to the following reaction:

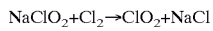

FIG. 1 is flow chart depicting a typical arrangement for removing chlorine dioxide from bleach plant gases according to the invention, and regenerating it in the bleach plant D stage. Caustic 1 and peroxide 3 are fed into a scrubber for vent gases 5 that are released from the bleach plant. These gases include chlorine dioxide, such as that which may be released from a chlorine dioxide generator, chlorine dioxide storage units, or chlorine dioxide sewers.

These chlorine dioxide containing gases are contacted in the scrubber with a solution containing the caustic and peroxide. The solution is recirculated counter-currently to the gases in a packed particle column.

The caustic 1 is generally in a concentration of 0.1 to 50%, preferably between about 5 and 25%, and most preferably about 20%. The peroxide 3 is generally in a concentration of 0.1 to 20%, preferably between about 2 and 10%, and most preferably about 5%.

The gases released from the plant 9 have sufficient chlorine dioxide removed from them to meet appropriate regulatory standards. Preferably more than 95% of the chorine dioxide is removed, most preferably more than about 99%, by the method of the invention.

While the method of the invention is intended to remove chlorine dioxide from vent gases in amounts that render the vent gas environmentally safe, the scrubber is preferably supplied with a backup system 19 of scrubbing chemicals that can be used as an alternate, or additional, means of removing the chlorine dioxide. For example, sodium thiosulfate, weak wash, white liquor, or $SO_2$ solution, can be employed in a conventional scrubbing reaction.

Sodium chlorite solution is removed from the scrubber through line 7 and maintained in a storage tank, from which it can be pumped to the D stage of the bleaching process. The sodium chlorite solution is brought through line 11 to the D stage mixer, to which is also fed pulp 13 and a mixture of chlorine dioxide and sulfuric acid 15. The chlorite solution can be added at any part of the D stage but is preferably added at the $D_0$ stage, which has a lower pH than later D stages. Preferably the chlorite solution is contacted with the sulfuric acid at a pH lower than 3.0, and most preferably about 2.5. The chlorite solution contained in the mixture 17 is oxidized to form chlorine dioxide.

The following Example is intended to illustrate the invention, and not to be construed as limiting its scope.

EXAMPLE

The method of the invention was employed in a bleach plant that used two scrubbers for removal of chlorine dioxide from bleach plant vent gases. The scrubbers had previously employed a 20% solution of sodium hydroxide and a 30% solution of sodium thiosulfate as scrubbing chemicals at total flow rates to the two scrubbers of 1.5 gallon per minute (gpm) of the sodium hydroxide solution and 6 gpm of the sodium thiosulfate solution. These solutions were replaced with a 20% solution of sodium hydroxide and a 5% solution of peroxide fed at total flow rates to the two scrubbers of 4 gpm of the sodium hydroxide solution and 3 gpm of the hydrogen peroxide solution, in combination with 2 gpm of water.

Use of the sodium hydroxide and peroxide combination was found to result in a decrease in chlorine dioxide in the scrubber input and output gases of from 84 lbs./hr. to 0.1 lbs./hr. in one scrubber (i.e., more than 99% removal from the vent gas), and from 37 lbs./hr. to 1.6 lbs./hr. in the other scrubber (i.e., more than 95% removal from the vent gas). These levels were acceptable under the appropriate regulatory standards, and were comparable to those achieved using the conventional chemicals. The cost of scrubbing with sodium hydroxide and peroxide was substantially lower than the cost of using the conventional scrubbing chemicals.

The sodium chlorite solution formed in the scrubbers was removed and brought to a storage tank, from which it was pumped to the pulp/chlorine dioxide mixer for the $D_0$ stage of the bleach plant at a rate of less than 10 gpm. Sulfuric acid was fed to the $D_0$ stage in a density of about 72 lbs./cubic ft. as required to obtain a pH of about 2.3. Chlorine dioxide was fed to the $D_0$ stage at a rate sufficient to obtain a concentration of between 1 and 2% based on bone dry weight of the brown stock fed to the $D_0$ stage, as required to adequately bleach the brown stock.

Samples of the sodium chlorite solution were recovered and tested to determine the concentration of the chlorine dioxide solution generated in the $D_0$ stage. Chlorine dioxide was found to be present in concentrations varying from 4.5 to 5.5 g/l. While this was more dilute than the approximately 8 to 8.5 g/l concentration of "virgin liquor" chlorine dioxide conventionally used, it was adequate for bleaching pulp. The method of the invention was estimated to be capable of suppling about 1000 lbs. of the 32,000 lbs./day of $ClO_2$ used in the D stage of the plant.

This experiment demonstrated that the method of the invention successfully uses inexpensive scrubbing chemicals to remove chlorine dioxide from bleach plant vent gas, and recovers chlorine dioxide for use in the D stage of the bleach plant.

What is claimed is:

1. In a method for recovering chlorine dioxide entrained in vent gas from a cellulose pulp bleaching process employing chlorine dioxide as a bleaching agent, the improvement comprising:

a) contacting a chlorine dioxide containing gas vented from a cellulose pulp bleaching process with an alkaline metal base and peroxide to form an alkaline metal chlorite solution; and b) oxidizing the alkaline metal chlorite solution with a mixture of chlorine dioxide and an acid in the presence of pulp to produce chlorine dioxide.

2. The method of claim 1, wherein said alkaline metal base is an alkaline metal hydroxide.

3. The method of claim 1, wherein said alkaline metal base is alkaline metal carbonate.

4. The method of claim 1, wherein said alkaline metal base is selected from the group consisting of sodium hydroxide, potassium hydroxide, sodium carbonate, potassium carbonate, sodium monoxide, and potassium monoxide.

5. The method of claim 1, wherein the alkaline metal chlorite solution and the mixture of chlorine dioxide and the acid are reacted at a pH lower than 3.0.

6. A method for recovering chlorine dioxide from bleach plant vent gas comprising:
   a) contacting bleach plant vent gas containing chlorine dioxide with an alkaline metal base and hydrogen peroxide in a bleach plant vent gas scrubber to form an alkaline metal chlorite solution; and
   b) contacting the alkaline metal chlorite solution with a mixture of chlorine dioxide and an acid in the presence of pulp to produce chlorine dioxide.

7. The method of claim 6, wherein the acid is sulfuric acid.

8. The method of claim 6 wherein the acid is selected from the group consisting of hydrochloric acid and nitric acid.

9. The method of claim 6, wherein said alkaline metal base is sodium hydroxide.

10. A method of claim 6, wherein the alkaline metal chlorite solution and the mixture of chlorine dioxide and the acid are reacted at a pH lower than 3.0.

11. A method for scrubbing chlorine dioxide from bleach plant vent gas comprising:
   a) contacting chlorine dioxide in the bleach plant vent gas with alkaline metal base and peroxide in a vent gas scrubber to form an alkaline metal chlorite solution;
   b) removing the alkaline metal chlorite solution from the scrubber; and
   c) reacting the alkaline metal chlorite solution with a mixture of chlorine dioxide and an acid in the presence of the pulp.

12. The method of claim 11, wherein said alkaline metal base is sodium hydroxide, and said alkaline metal chlorite solution comprises sodium chlorine.

13. The method of claim 11, wherein the alkaline metal chlorite solution and the mixture of chlorine dioxide and the acid are reacted at a pH lower than 3.0.

* * * * *